June 10, 1930.  G. L. R. J. MESSIER  1,763,405

BRAKE CONTROL SYSTEM FOR THE WHEELS OF AIRPLANES

Filed Sept. 7, 1928

INVENTOR
George Louis René Jean Messier by

Attorney

Patented June 10, 1930

1,763,405

UNITED STATES PATENT OFFICE

GEORGES LOUIS RENÉ JEAN MESSIER, OF MONTROUGE, FRANCE

BRAKE CONTROL SYSTEM FOR THE WHEELS OF AIRPLANES

Application filed September 7, 1928, Serial No. 304,432, and in France September 21, 1927.

Upon landing, an airplane, after having taken contact with the ground, still runs during a somewhat long time. It is of great advantage to reduce the distance the airplane runs on the ground and, for that purpose, it has been necessary to mount on the wheels of the airplane brakes similar to those of motor cars.

However, owing to the high position of the center of gravity of the apparatus, the braking must be effected with great caution, otherwise the airplane risks of turning over. On the other hand, the braking of an airplane of several tons, would necessitate, with the ordinary systems, a considerable effort on the part of the pilot.

The present invention has for object an improved brake control system for airplanes.

According to its principle, this system utilizes the regulating action of the pressure of the airplane tail skid on the ground.

In fact, it is known that when an airplane runs on the ground, a relatively important part of its weight is supported by the tail skid; the braking causes an over-load on the front wheels and a diminution of load on the tail skid.

The system consists therefore in effecting the application of the brakes by the combined action of the pressure of the tail skid and of a control actuated by the pilot; this latter control may be common to both wheels; it may also be individual for each wheel, in order to facilitate the steering on the ground.

In the description given hereinafter, the expression "control by the pilot" will be used and it is to be understood that this control can be individual for each wheel.

The combined control forming the essential subject-matter of the invention can be obtained in the two main manners hereinafter indicated:

(a) the reaction of the ground on the tail skid is used for allowing or preventing the application of the brakes by the pilot; this application can take place only when the said reaction is maintained above a suitable predetermined value. The desired security is thus obtained.

(b) the reaction of the ground on the tail skid contributes to the application of the brakes, or even effects alone this application, the ratio of the intensity of the reaction to the braking produced being determined by the intervention of the pilot.

In the latter case, the combined control gives not only the desired security but it acts also as a real auxiliary brake, so that the pilot has not to exert a great effort.

In order to obtain a complete security, the pilot must not be capable of acting on his control before landing, as otherwise a too rough application of the brakes might take place at the time the airplane comes in contact with the ground.

For the purpose, a locking device can be provided, preventing the dispacement of the control by the pilot before the tail skid comes in contact with the ground.

A second device can also be used, which device acts for retarding the braking action produced by the tail skid, whilst allowing the release of the brakes to instantaneously take place.

This latter device offers, moreover, the advantage of avoiding that the intensity of application of the brakes varies at every instant with the variations of pressure of the tail skid on the ground, owing to the unevenness of the latter.

The braking devices on the wheels of airplanes, the principle of which has just been given, are diagrammatically illustrated in the accompanying drawing in which.

Figure 1:
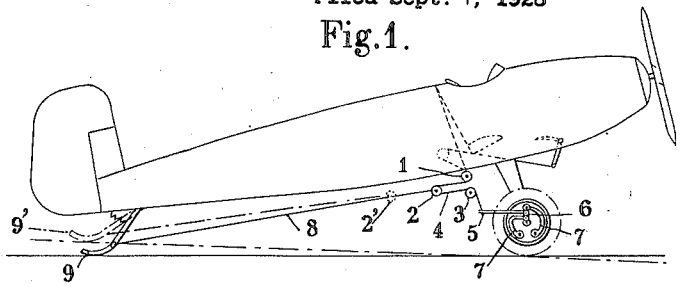
Fig. 1 shows in side view a landing chassis of airplane comprising, for the brakes of the wheels, the control combined by the action of the pilot and the reaction of the tail skid.

In the case of Fig. 1, the control of the brakes is ensured by the pilot by means of a system of links or cables and of any transmission members, with interposition, at a given point, of a system of security controlled by the tail skid.

This system can consist in three pulleys 1, 2, 3 on which passes the control cable 4 connecting the pedal of the pilot to the lever 5 controlling the cam 6 acting on the jaws 7 of the brake of the wheel. The pulley 2 can be displaced by the pull exerted on the cable 8 by the tail skid 9. The application of the brakes can be effected by the pilot only when the tail skid having moved to 9', the pulley 2 has been brought back in the left-hand position 2'. This is accomplished by leaving enough slack in the cable 4 to prevent the pilot's control from operating the brake until this slack is taken up by the movement of the pulley 2 in response to the movement of the tail skid.

Figure 2:
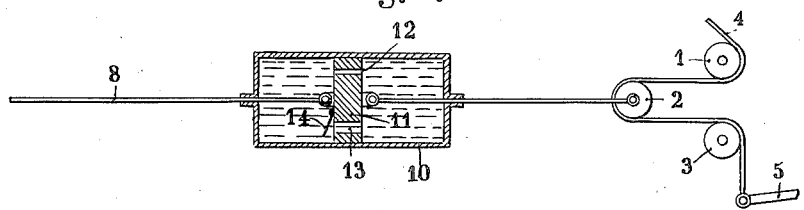
Fig. 2 is a section of a device for applying the brakes with retarded action.

The device for applying the brakes, with retarded action, can be composed of an oil brake with a valve allowing the instantaneous release (Fig. 2). In this figure, 10 designates a cylinder full of liquid, in which can move the piston 11 provided with a small orifice 12 and a large orifice 13, the latter being provided with a valve 14 allowing the free circulation of the oil in one direction only.

This brake is interposed on the cable 8 connecting the tail skid to the control of the pilot, that is to say, in the example shown, to the pulley 2.

If it is desired to use the pressure of the tail skid on the ground for causing the application of the brakes, the pilot adjusting the ratio between this pressure and the intensity of the braking, it will be possible (Fig. 3) to cause the control 15, coming directly from the tail skid, to act on a lever 16 of variable length, from 0 to a maximum according to the pilot's will. The lever 16 rocks about the axis 20 of the brake control cam (not shown).

The control 15 moves a slide-block 17 in a slide 18 of the lever 16. At 19' is attached the control 19 leading from the pilot's seat and which causes the slide-block to move up or down, that is to say of varying the leverage acting on the brake control cam.

The slide may be inclined in such a way that the pull of the control coming from the tail skid, on the slide-block, may have a component directed in reverse direction to the control of the pilot, in order that the latter supports a part of the braking stress and thus can estimate the intensity of the latter.

Generally speaking, it will be more simple to use the hydraulic transmission for avoiding the links and transmission members. In this case, use can be made of a pump barrel, the piston of which is controlled by the tail skid and of another pump barrel, the piston of which is controlled by the pilot. The control of the brakes will be combined in such a manner as to be possible only when, both pump barrels being actuated, the members for applying the brake will receive liquid under pressure from these two sources. The proportions of the various parts are so chosen for this purpose that the pressure on the brake lever caused by either one of the pistons alone will not be sufficient to apply the brake, but the combined movement of both will operate the lever in the proper manner and with sufficient force to apply the brake.

Figure 4:
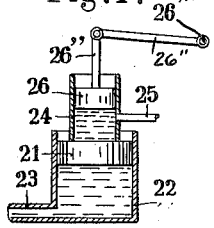
Figs. 4 and 5 illustrate devices with hydraulic transmission for the combined control of the braking.
Figure 5:
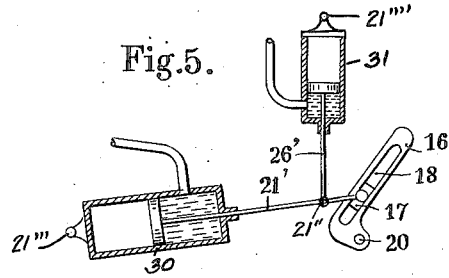

This combination will be effected either in order to simply ensure the security (Fig. 4), or to add the action of auxiliary brake (Fig. 5).

In the case of Fig. 4, the piston 21 of the pump barrel 22 is under the action of the tail skid through the medium of the liquid circulating in the tube 23. The piston 21 supports the pump barrel 24 connected, through the tube 25, with the control of the pilot. The piston 26 of the pump barrel 24 controls the braking member through the lever 26" pivoted at 26"' on the brake control cam. The fluid may be supplied in either of two ways. The tail skid and the pilot's control may act directly, as by means of pistons, on the liquid so as to force it into the cylinders, or the controls may be so arranged as to open valves which will permit fluid under pressure to enter the pipes and the cylinders.

Figure 3:
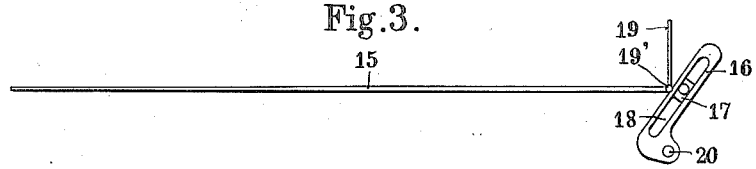
Fig. 3 shows, by way of example, a device acting as an auxiliary brake.

In the example shown in Fig. 5, the rods 21' and 26' of the pistons actuate the slide-block 17 of a device similar to that of Fig. 3. The cylinders 30 and 31 in which the pistons move are pivotally mounted at 21"' and 21"" respectively, and the rods 21' and 26' are pivotally joined at 21".

Figure 6:
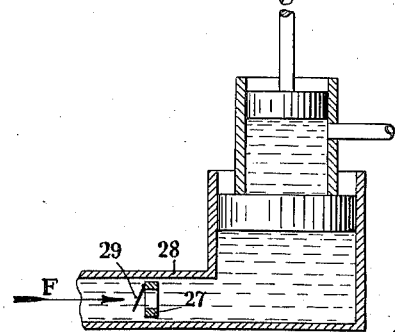
Fig. 6 illustrates a retarding device in the case of the hydraulic control.

In the case of the hydraulic control, the device for retarding the brake-applying action can be very easily realized (Fig. 6) by means of a diaphragm having a reduced section 27, interposed on the piping 28; a flap-valve 29 is carried by this diaphragm.

The retarding action is exerted by the diaphragm when the liquid circulates in the direction of the arrow F; in the other direction, the flap-valve allows the free pasage of the liquid and, consequently, the instantaneous release of the brake is possible.

Claims:—

1. In a brake control system for airplane wheels, a control actuated by the tail skid, a lever connected to said control and to the brake, and means controlled by the pilot for varying the effective length of said lever.

2. In a brake control system for airplane wheels, a cylinder, means controlled by the tail skid for supplying fluid to said cylinder, a piston in said cylinder, a lever adapted to control the brakes, a member connected to said piston and pivoted to said lever, and means controlled by the pilot for varying said pivot point to change the effective length of said lever.

3. In a brake control system for airplane wheels, a cylinder, means controlled by the tail skid for supplying fluid to said cylinder, a piston in said cylinder, a lever adapted to control the brakes, a member connected to said piston and pivoted to said lever, a second cylinder, a piston in said second cylinder, a second member connected to said second piston and pivotally connected to said first member at an angle thereto, and means controlled by the pilot for supplying fluid to said second cylinder to move said first member transversely to vary the effective length of said lever.

4. In a brake control system for airplane wheels, a cylinder, means controlled by the tail skid for supplying fluid to said cylinder, a piston in said cylinder, a lever adapted to control the brakes, a member connected to said piston and pivoted to said lever, means controlled by the pilot for varying said pivot point to change the effective length of said lever, and means for retarding the action of the tail skid on the fluid.

5. In a brake control system for airplane wheels, a cylinder, means controlled by the tail skid for supplying fluid to said cylinder, a piston in said cylinder, a lever adapted to control the brakes, a member connected to said piston and pivoted to said lever, means controlled by the pilot for varying said pivot point to change the effective length of said lever, and means for retarding the action of the tail skid on the fluid, said means comprising a diaphragm in the fluid supply system of less diameter than said system, and a one way valve mounted in said diaphragm.

6. In a brake control system for airplane wheels, a cylinder, means controlled by the tail skid for supplying fluid to said cylinder, a piston in said cylinder, a lever adapted to control the brakes, a member connected to said piston and pivoted to said lever, a second cylinder, a piston in said second cylinder, a second member connected to said second piston and pivotally connected to said first member at an angle thereto, means controlled by the pilot for supplying fluid to said second cylinder to move said first member transversely to vary the effective length of said lever, and means for retarding the action of the tail skid on the fluid.

7. In a brake control system for airplane wheels, a cylinder, means controlled by the tail skid for supplying fluid to said cylinder, a piston in said cylinder, a lever adapted to control the brakes, a member connected to said piston and pivoted to said lever, a second cylinder, a piston in said second cylinder, a second member connected to said second piston and pivotally connected to said first member at an angle thereto, means controlled by the pilot for supplying fluid to said second cylinder to move said first member transversely to vary the effective length of said lever, and means for retarding the action of the tail skid on the fluid, said means comprising a diaphragm in the fluid supply system of less diameter than said system, and a one way valve mounted in said diaphragm.

8. In a brake control system for airplane wheels, a lever adapted to actuate the brakes, two cylinders, a piston in each of said cylinders, means actuated by the tail skid for supplying fluid to one of said cylinders, means controlled by the pilot for supplying fluid to the other of said cylinders, and means connected to said pistons operating conjointly to actuate said lever.

The foregoing specification of my "improved brake control system for the wheels of airplanes" signed by me this 28th day of August, 1928.

GEORGES LOUIS RENÉ JEAN MESSIER.